United States Patent [19]

Ma et al.

[11] Patent Number: 5,085,698
[45] Date of Patent: Feb. 4, 1992

[54] AQUEOUS PIGMENTED INKS FOR INK JET PRINTERS

[75] Inventors: Sheau-Hwa Ma, Chadds Ford, Pa.; Howard Matrick, Highlands, N.J.; Arthur C. Shor, Concordville, Pa.; Harry J. Spinelli, Wilmington, Del.

[73] Assignee: E. I. Du Pont de Nemours and Company, Wilmington, Del.

[21] Appl. No.: 508,145

[22] Filed: Apr. 11, 1990

[51] Int. Cl.$^5$ .............................................. C09D 11/10
[52] U.S. Cl. ...................................................... 106/20
[58] Field of Search ........................................... 106/20

[56] References Cited

U.S. PATENT DOCUMENTS

| | | | |
|---|---|---|---|
| 4,048,132 | 9/1977 | Tsuchiya et al. | 260/33.6 UA |
| 4,059,554 | 11/1977 | Pacansky | 260/29.6 WQ |
| 4,597,794 | 7/1986 | Ohta et al. | 106/20 |
| 4,656,226 | 4/1987 | Hutchins et al. | 525/93 |
| 4,692,188 | 9/1987 | Ober et al. | 106/23 |
| 4,755,563 | 7/1988 | West | 525/287 |

FOREIGN PATENT DOCUMENTS 1324745  7/1973  United Kingdom .

*Primary Examiner*—William R. Dixon, Jr.
*Assistant Examiner*—Margaret V. Einsmann

[57] ABSTRACT

A pigmented ink for ink jet printers which comprises an aqueous carrier medium, and pigment particles dispersed in an AB or BAB block copolymer having a hydrophilic segment and a segment that links to the pigment. The A block and the B block(s) have molecular weights of at least 300. These inks give images having good print quality, water and smear resistance, lightfastness, and storage stability.

25 Claims, No Drawings

AQUEOUS PIGMENTED INKS FOR INK JET PRINTERS

FIELD OF THE INVENTION

This invention relates to aqueous pigmented inks for ink jet printers, and, more particularly, to aqueous pigmented inks wherein the pigment dispersant is an acrylic block polymer.

BACKGROUND OF THE INVENTION

Ink jet printing is a non-impact method for recording information in response to an electronic signal, such as that generated by a computer. In the printer the electronic signal produces droplets of ink that are deposited on a substrate such as paper. Ink jet printers have found broad commercial acceptance due to their rapid printing speeds, relatively quiet operation, graphic capability and low cost.

The printed image produced by an ink jet printer, as in most printing processes, consists of discrete dots. While satisfactory for many applications, conventional dye based inks are not well suited for recording high quality images since the dye tends to wick in the paper fibers, causing the dots to have a feathered edge. Thus, the dots do not have the sharp boundaries needed to produce a high resolution image unless special paper is used. Also, the dyes tend to smear after the printing operation due to their high water solubility.

Limitations of dye based inks are particularly apparent when it is desired to record a high quality, multi-colored image. Color selection is limited in that many of the readily available dyes lack color fastness (i.e., the dye tends to fade upon exposure to ultraviolet light) or do not have enough solubility to give the desired chroma. Moreover, the tendency of the printed dots to wick, or bleed together, is an aggravated problem because the printing of a high quality image depends on the formation of small, sharply defined dots of each printing color. While some of the problems associated with dye based inks may be overcome or alleviated to some extent by using special substrates, such as coated paper, there is a need for improved inks for ink jet printing.

Water-based pigment dispersions are well known in the art, and have been used commercially for applying films, such as paints, to various substrates. The pigment dispersion is generally stabilized by either a non-ionic or ionic technique. When using the non-ionic technique, the pigment particles are stabilized by a polymer that has a water-soluble, hydrophilic section that extends into the water and provides entropic or steric stabilization. Representative polymers useful for this purpose include polyvinyl alcohol, cellulosics, ethylene oxide modified phenols, and ethylene oxide/propylene oxide polymers. While the non-ionic technique is not sensitive to pH changes or ionic contamination, it has a major disadvantage for many applications in that the final product is water sensitive. Thus, if used in ink applications or the like, the pigment will tend to smear upon exposure to moisture.

In the ionic technique, the pigment particles are stabilized by a polymer of an ion containing monomer, such as neutralized acrylic, maleic, or vinyl sulfonic acid. The polymer provides stabilization through a charged double layer mechanism whereby ionic repulsion hinders the particles from flocculating. Since the neutralizing component tends to evaporate after application, the polymer then has reduced water solubility and the final product is not water sensitive.

U.S. Pat. No. 4,597,794 to Canon proposes an aqueous ink dispersion for ink jet printers in which pigment is contained in a polymer having ionic hydrophilic segments and aromatic hydrophobic segments that adhere to the pigment surface. While the random polymer dispersants proposed therein offer improved stability for the dispersed pigment, further improvements are desired to meet the demanding needs of commercial ink jet printers.

SUMMARY OF THE INVENTION

The present invention provides a pigmented aqueous ink particularly adapted to meet the demanding requirements of ink jet printers, the ink comprising an aqueous carrier medium and particles of pigment stabilized by an AB or BAB block copolymer wherein:

(a) the A segment is a hydrophobic homopolymer or copolymer of an acrylic monomer having the formula $$CH_2=C(X)(Y)$$

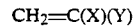

X is H or $CH_3$; and Y is $C(O)OR_1$, $C(O)NR_2R_3$, or CN, wherein $R_1$ is an alkyl, aryl, or alkylaryl group having 1 to 20 carbon atoms, and $R_2$ and $R_3$ are hydrogen or an alkyl, aryl, or alkylaryl group having 1 to 9 carbon atoms; said A segment having an average molecular weight of at least approximately 300 and being water insoluble; and (b) the B segment is a hydrophilic polymer, or salt thereof, of
(1) an acrylic monomer having the formula $$CH_2=C(X)(Y^1)$$

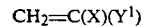

wherein X is H or $CH_3$; and $Y^1$ is $C(O)OH$, $C(O)NR_2R_3$, $C(O)OR_4NR_2R_3$ or $C(O)OR_5$; wherein $R_2$ and $R_3$ are hydrogen or an alkyl, aryl, or alkylaryl group having 1 to 9 carbon atoms; $R_4$ is an alkyl diradical having 1 to 5 carbon atoms; and R5 is an alkyl diradical having 1 to 20 carbon atoms and optionally containing one or more hydroxyl or ether groups; or (a) a copolymer of the acrylic monomer of (1) with an acrylic monomer having the formula $$CH_2=C(X)(Y)$$

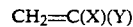

where X and Y are the substituent groups defined for said A segment;
said B segment having an average molecular weight of at least approximately 300 and being water soluble.

Preferred A segments are polymers and copolymers methyl methacrylate, butyl methacrylate, or 2-ethylhexyl methacrylate. Polymers or copolymers of methacrylic acid or dialkylaminoethyl methacrylate, where alkyl is methyl through butyl, are preferred as the B segments. The B block will comprise 10 to 90%, preferably 25 to 65% by weight of the entire polymer. The pigmented inks generally will contain approximately 0.1 to 10% pigment, by weight, but may contain higher amounts, such as 30%, depending on the selected pigment and block polymer, and the ink jet printer.

The inks are extremely stable, have low viscosity, exhibit excellent print quality, have long crusting time, and provide excellent smear resistance after drying. They may be used with a variety of ink jet printers, and are particularly adapted for use in thermal ink jet printers.

DETAILED DESCRIPTION OF THE INVENTION

The present invention provides inks having a combination of properties particularly suited for use in ink jet printers in general, and thermal ink jet printers in particular. The inks are aqueous dispersions of pigment particles, stabilized by polymers, that are stable over long periods, both in storage and in the printer. The inks may be adapted to the requirements of a particular ink jet printer to provide a balance of light stability, smear resistance, viscosity, surface tension, high optical density, and crust resistance. Resulting printed images are of high quality in that the individual dots are round with sharp edges, and there is little bleeding, feathering, or strike through.

ACRYLIC BLOCK COPOLYMER

The polymer is an AB or BAB block copolymer wherein the A block is hydrophobic and serves to link with the pigment, and the B block is hydrophilic and serves to disperse the pigment in the aqueous medium. Selection of the polymer for a specific application will depend on the selected pigment and aqueous medium. In general, the polymer is an AB or BAB block copolymer wherein (a) the A segment is a hydrophobic homopolymer or copolymer of an acrylic monomer having the formula $$CH_2=C(X)(Y)$$

wherein X is H or $CH_3$; and Y is $C(O)OR_1$, $C(O)NR_2R_3$, or CN, wherein $R_1$ is an alkyl, aryl, or alkylaryl group having 1 to 20 carbon atoms, and $R_2$ and $R_3$ are hydrogen or an alkyl, aryl, or alkylaryl group having 1 to 9 carbon atoms; said A segment having an average molecular weight of at least approximately 300 and being water insoluble; and (b) the B segment is a hydrophilic polymer, or salt thereof, of (1) an acrylic monomer having the formula $$CH_2=C(X)(Y^1),$$

wherein X is H or $CH_3$; and $Y^1$ is C(O)OH, $C(O)NR_2R_3$, $C(O)OR_4NR_2R_3$ or $C(O)OR_5$; wherein $R_2$ and $R_3$ are hydrogen or an alkyl, aryl, or alkylaryl group having 1 to 9 carbon having 1 to 5 carbon atoms; and R5 is an alkyl diradical having 1 to 20 carbon atoms and optionally containing one or more hydroxyl or ether groups; or (2) a copolymer of the acrylic monomer of (1) with an acrylic monomer having the formula $$CH_2=C(X)(Y)$$

where X and Y are the substituent groups defined for the the B segment having an average molecular weight of at least approximately 300 and being water soluble.

The B block(s) generally will constitute 10 to 90%, preferably 25 to 65%, of the entire block polymer by weight.

The A block is a polymer or copolymer prepared from at least one acrylic monomer having the formula set forth above. The $R_1$, $R_2$ and $R_3$ groups optionally may contain hydroxy, ether, OSi(CH3)3 groups, and similar substituent groups. Representative monomers that may be selected include, but are not limited to, the following: methyl methacrylate (MMA), ethyl methacrylate (EMA), propyl methacrylate, n-butyl methacrylate (BMA or NBMA), hexyl methacrylate, 2-ethylhexyl methacrylate (EHMA), octyl methacrylate, lauryl methacrylate (LMA), stearyl methacrylate, phenyl methacrylate, hydroxyethyl methacrylate (HEMA), hydroxypropyl methacrylate, 2-ethoxyethyl methacrylate, methacrylonitrile, 2-trimethylsiloxyethyl methacrylate, glycidyl methacrylate(GMA), p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, hydroxyethyl acrylate, hydroxypropyl acrylate acrylonitrile, 2-trimethylsiloxyethyl acrylate, glycidyl acrylate, p-tolyl acrylate, and sorbyl acrylate. Preferred A blocks are homopolymers and copolymers prepared from methyl methacrylate, butyl methacrylate, 2-ethylhexyl methacrylate, or copolymers of methyl methacrylate with butyl methacrylate.

The A block also may contain a hydrophilic monomer such as $CH_2=C(X)(Y)'$, wherein X is H or $CH_3$ and Y' is C(O)OH, $C(0)NR_2R_3$, $C(O)OR_4NR_2R_3$, $C(OR_5)$, or their salts, wherein $R_2$ and $R_3$ may be H or C1 to C9 alkyl, aryl, or alkylaryl, $R_4$ is a C1 to C5 alkyl diradical, and $R_5$ is a C1 to C20 alkyl diradical which may contain hydroxy or ether groups, to provide some changes in solubility. However, there should not be enough hydrophilic monomer present in the A block to render it, or its salt, completely water soluble.

The B block is a polymer prepared from at least one acrylic monomer having the formula provided above. Representative monomers include methacrylic acid (MAA), acrylic acid, dimethylaminoethyl methacrylate (DMAEMA), diethylaminoethyl methacrylate, t-butylaminoethyl methacrylate, dimethylaminoethyl acrylate, diethylaminoethyl acrylate, dimethylaminopropyl methacrylamide, methacrylamide, acrylamide, and dimethylacrylamide. Homopolymers or copolymers of methacrylic acid or dimethylaminoethyl methacrylate are preferred.

The acid containing polymer may be made directly or may be made from a blocked monomer with the blocking group being removed after polymerization. Examples of blocked monomers that generate acrylic or methacrylic acid after removal of the blocking group include: trimethylsilyl methacrylate (TMS-MAA), trimethylsilyl acrylate, 1-butoxyethyl methacrylate, 1-ethoxyethyl methacrylate, 1-butoxyethyl acrylate, 1-ethoxyethyl acrylate, 2-tetrahydropyranyl acrylate, and 2-tetrahydropyranyl methacrylate.

The B block may be a copolymer of an acid or amino containing monomer with other monomers, such as those used in the A block. The acid or amino monomer may be used in a range of 10 to 100%, preferable in a range of 20 to 60%, of the B block composition. The B block(s) generally will constitute 10 to 90%, preferably 25 to 65%, of the entire block polymer by weight.

Block copolymers that are selected in practicing the invention have a number average molecular weight below 20,000, preferably below 15,000, and typically in the range of 1,000 to 3,000. Preferred block copolymers have number average molecular weights in the range of 500 to 1500 for each A and B block.

Representative AB and BAB block polymers that may be selected include the following, wherein the values recited represent the degree of polymerization of each monomer. A double slash indicates a separation between blocks and a single slash indicates a random copolymer. For example, MMA//MMA/MMA 10//5/7.5 is an AB block polymer with an A block of MMA that is 10 monomer units long—molecular weight of 1000—and a B block that is a copolymer of MMA and MAA with 5 monomer units of MMA and 7.5 units of MAA; molecular weight of the B block is 1145.

|  | MOL. WEIGHT |
|---|---|
| AB BLOCK POLYMER | |
| EHMA//EHMA/MAA | |
| 3//3/5 | 1618 |
| 5//2.5/2.5 | 1700 |
| 5//5/10 | 2840 |
| 20//10/10 | 6800 |
| 15//11/22 | 7040 |
| EHMA//LMA/MAA | 5552 |
| 10//10/12 | |
| EHMA//MMA/EHMA/MAA | 4502 |
| 10//5/5/12 | |
| EHMA//MMA/MAA | |
| 5//5/10 | 2350 |
| 5//10/10 | 2850 |
| EHMA//MAA | 3400 |
| 15//5 | |
| BMA//BMA/MAA | |
| 5//2.5/2.5 | 1280 |
| 10//5/10 | 3000 |
| 20//10/20 | 6000 |
| 15//7.5/3 | 3450 |
| 5//5/10 | 2300 |
| 5//10/5 | 2560 |
| BMA//MMA/MAA | |
| 15//15/5 | 4060 |
| 15//7.5/3 | 3140 |
| 10//5/10 | 2780 |
| MMA//MMA/MAA | |
| 10//5/10 | 2360 |
| 10//5/5 | 1930 |
| 10//5/7.5 | 2150 |
| 20//5/7.5 | 3150 |
| 15//7.5/3 | 2770 |
| MMA//EHMA/MAA | |
| 5//5/10 | 2350 |
| 10//5/10 | 2850 |
| BMA/MMA//BMA/MAA | 2780 |
| 5/5//5/10 | |
| BMA//HEMA/MAA | |
| 15//7.5/3 | 3360 |
| 7.5//7.5/3 | 2300 |
| 15//7.5/7.5 | 3750 |
| BMA//BMA/DMAEMA | 3700 |
| 10//5/10 | |
| BMA//BMA/DMAEMA/MAA | 2635 |
| 10//5/5/5 | |
| BAB CLOCK POLYMER | |
| BMA/MAA//BMA//BMA/MAA | 4560 |
| 5/10//10//5/10 | |
| MMA/MAA//MMA//MMA/MAA | 3290 |
| 5/7.5//10//5/7.5 | |

Preferred block polymers are methyl methacrylate//methyl methacrylate/methacrylic acid (10//5/7.5), 2-ethylhexyl methacrylate//2-ethylhexyl methacrylate/methacrylic acid (5//5/10), n-butyl methacrylate//n-butyl methacrylate/methacrylic acid (10//5/10), ethylhexyl methacrylate//methyl methacrylate/methacrylic acid (5//10/10), n-butyl-methacrylate//2-hydroxyethyl methacrylate/methacrylic acid (5//10/10), n-butylmethacrylate//2-hydroxyethyl methacrylate/methacrylic acid (15//7.5/3), methyl methacrylate//ethylhexyl methacrylate/methacrylic acid (5//5/10), and butyl methacrylate//butyl methacrylate/dimethylaminoethyl methacrylate (10//5/10).

To solubilize the B block into the aqueous medium, it may be necessary to make salts of either the acid or amino groups contained in the B block. Salts of the acid monomers can be made with the counter component being selected from organic bases such as mono-, di, tri-methylamine, morpholine, n-methyl morpholine; alcohol amines such as dimethylethanolamine (DMEA), methyldiethanolamine, mono-, di, and tri-ethanolamine; pyridine; ammonium hydroxide; tetra-alkylammonium salts such as tetramethylammonium hydroxide, tetraethyl-ammonium hydroxide; alkali metals such as lithium, sodium and potassium, and the like. Preferred neutralizing agents include dimethylethanolamine and sodium and potassium hydroxides, with potassium hydroxide being particularly preferred for inks to be used in thermal ink jet printers. Salts of the amino monomers can be made with the counter component being selected from organic acids such as acetic acid, formic acid, oxalic acid, dimethylol propionic acid, halogens such as chloride, fluoride, and bromide, and inorganic acids, such as sulfuric acid, and nitric acid, and the like. It is also possible to convert the amino group into a tetra-alkyl ammonium salt. Acetic and formic acid are preferred neutralizing agents. Amphoteric polymers, that is polymer that contains both an acid group and an amino group, may be used as is or can be neutralized with either addition of acid or base.

The AB and BAB polymers can be advantageously produced by stepwise polymerization process such as anionic or group transfer polymerization as described in Webster, U.S. Pat. No. 4,508,880, the disclosure of which is incorporated herein by reference. Polymers so produced have precisely controlled molecular weight, block sizes and very narrow molecular weight distributions. The polymer typically has a dispersity less than 2, generally in the range of 1.0 to 1.4. Dispersity is the polymer weight average molecular weight divided by its number average molecular weight. Number average molecular weight can be determined by gel permeation chromatography (GPC). The AB or BAB block polymers may also be formed by free radical polymerization wherein the initiation unit is comprised of two different moieties which initiate polymerization at two distinctly different temperatures. However, this method may cause contamination of the block copolymers with homopolymer and coupled products.

The AB block polymers also may be prepared using conventional anionic polymerization techniques, in which a first block of the copolymer is formed, and upon completion of the first block, a second monomer stream is started to form a subsequent block of the polymer. A low reaction temperature (e.g., 0 to −70° C.) is maintained in this case to minimize side reactions and form blocks of the desired molecular weights.

With many of these techniques, and especially with the group transfer polymerization process, the initiator may be non-functional, may contain an acid group (used as is or in a blocked form) or may contain an amino group. Either the hydrophobic A block or the hydrophilic B block may be made first. The BAB block polymers also may be prepared by anionic polymerization or group transfer polymerization techniques by first polymerizing one of the B Blocks, then polymerizing the hydrophobic A block, and then polymerizing the second B Block.

PIGMENTS

A wide variety of organic and inorganic pigments, alone or in combination, may be selected to make the ink. The term "pigment" as used herein means an insoluble colorant. The pigment particles are sufficiently small to permit free flow of the ink through the ink jet printing device, especially at the ejecting nozzles that usually have a diameter ranging from 10 micron to 50 micron. The particle size also has an influence on the pigment dispersion stability, which is critical throughout the life of the ink. Brownian motion of minute particles will help prevent the particles from flocculation. It is also desirable to use small particles for maximum color strength and gloss. The range of useful particle size is approximately 0.005 micron to 15 micron. Preferably, the pigment particle size should range from 0.005 to 5 micron and, most preferably, from 0.005 to 1 micron.

The selected pigment may be used in dry or wet form. For example, pigments are usually manufactured in aqueous media and the resulting pigment is obtained as water wet presscake. In presscake form, the pigment is not agglomerated to the extent that it is in dry form. Thus, pigments in water wet presscake form do not require as much deflocculation in the process of preparing the inks as dry pigments. Representative commercial dry pigments that may be selected to advantage are:

| Pigment Brand Name | Manufacturer | Colour Index Pigment |
|---|---|---|
| Permanent Yellow DHG | Hoechst | Yellow 12 |
| Permanent Yellow GR | Hoechst | Yellow 13 |
| Permanent Yellow G | Hoechst | Yellow 14 |
| Permanent Yellow NCG-71 | Hoechst | Yellow 16 |
| Permanent Yellow GG | Hoechst | Yellow 17 |
| Hansa Yellow RA | Hoechst | Yellow 73 |
| Hansa Brilliant Yellow 5GX-02 | Hoechst | Yellow 74 |
| Dalamar ® Yellow YT-858-D | Heubach | Yellow 74 |
| Hansa Yellow X | Hoechst | Yellow 75 |
| Novoperm ® Yellow HR | Hoechst | Yellow 83 |
| Chromophtal ® Yellow 3G | Ciba-Geigy | Yellow 93 |
| Chromophtal ® Yellow GR | Ciba-Geigy | Yellow 95 |
| Novoperm ® Yellow FGL | Hoechst | Yellow 97 |
| Hansa Brilliant Yellow 10GX | Hoechst | Yellow 98 |
| Permanent Yellow G3R-01 | Hoechst | Yellow 114 |
| Chromophtal ® Yellow 8G | Ciba-Geigy | Yellow 128 |
| Irgazin ® Yellow 5GT | Ciba-Geigy | Yellow 129 |
| Hostaperm ® Yellow H4G | Hoechst | Yellow 151 |
| Hostaperm ® Yellow H3G | Hoechst | Yellow 154 |
| L74-1357 Yellow | Sun Chem. | |
| L75-1331 Yellow | Sun Chem. | |
| L75-2377 Yellow | Sun Chem. | |
| Hostaperm ® Orange GR | Hoechst | Orange 43 |
| Paliogen ® Orange | BASF | Orange 51 |
| Irgalite ® Rubine 4BL | Ciba-Geigy | Red 57:1 |
| Quindo ® Magenta | Mobay | Red 122 |
| Indofast ® Brilliant Scarlet | Mobay | Red 123 |
| Hostaperm ® Scarlet GO | Hoechst | Red 168 |
| Permanent Rubine F6B | Hoechst | Red 184 |
| Monastral ® Magenta | Ciba-Geigy | Red 202 |
| Monastral ® Scarlet | Ciba-Geigy | Red 207 |
| Heliogen ® Blue L 6901F | BASF | Blue 15:2 |
| Heliogen ® Blue NBD 7010 | BASF | |
| Heliogen ® Blue K 7090 | BASF | Blue 15:3 |
| Heliogen ® Blue L 7101F | BASF | Blue 15:4 |
| Paliogen ® Blue L 6470 | BASF | Blue 60 |
| Heucophthal ® Blue G, XBT-583D | Heubach | Blue 15:3 |
| Heliogen ® Green K 8683 | BASF | Green 7 |
| Heliogen ® Green L 9140 | BASF | Green 36 |
| Monastral ® Violet R | Ciba-Geigy | Violet 19 |
| Monastral ® Red B | Ciba-Geigy | Violet 19 |
| Quindo ® Red R6700 | Mobay | |
| Quindo ® Red R6713 | Mobay | |
| Indofast ® Violet | Mobay | Violet 23 |
| Monastral ® Violet Maroon B | Ciba-Geigy | Violet 42 |
| Raven ® 1170 | Col. Chem. | Black 7 |
| Special Black 4A | Degussa | Black 7 |
| Sterling ® NS Black | Cabot | Black 7 |
| Sterling ® NSX 76 | Cabot | Black 7 |
| Tipure ® R-101 | Du Pont | *** |
| Mogul L | Cabot | Black 7 |
| BK 8200 | Paul Uhlich | Black 7 |

***Note: No Colour Index Pigment notation for Tipure ®

Representative commercial pigments that can be used in the form of a water wet presscake include: Heucophthal ® Blue BT-585-P, Toluidine Red Y (C.I. Pigment Red 3), Quindo ® Magenta (Pigment Red 122), Magenta RV-6831 presscake (Mobay Chemical, Harmon Division, Haledon, N.J.), Sunfast ® Magenta 122 (Sun Chemical Corp., Cincinnati, OH), Indo ® Brilliant Scarlet (Pigment Red 123, C.I. No. 71145), Toluidine Red B (C.I. Pigment Red 3), Watchung ® Red B (C.I. Pigment Red 48), Permanent Rubine F6B13-1731 (Pigment Red 184), Hansa ® Yellow (Pigment Yellow 98), Dalamar ® Yellow YT-839-P (Pigment Yellow 74, C.I. No. 11741, Sunbrite ® Yellow 17 (Sun Chemical Corp, Cincinnati, Ohio), Toluidine Yellow G (C.I. Pigment Yellow 1), Pigment Scarlet (C.I. Pigment Red 60), Auric Brown (C.I. Pigment Brown 6), etc. Black pigments, such as carbon black, generally are not available in the form of aqueous presscakes.

Fine particles of metal or metal oxides also may be used to practice the invention. For example, metal and metal oxides are suitable for the preparation of magnetic ink jet inks. Fine particle size oxides, such as silica, alumina, titania, and the like, also may be selected. Furthermore, finely divided metal particles, such as copper, iron, steel, aluminum and alloys, may be selected for appropriate applications.

AQUEOUS CARRIER MEDIUM

The aqueous carrier medium is water or a mixture of water and at least one water soluble organic solvent. Selection of a suitable mixture depends on requirements of the specific application, such as desired surface tension and viscosity, the selected pigment, drying time of the pigmented ink jet ink, and the type of paper onto which the ink will be printed. Representative examples of water-soluble organic solvents that may be selected include (1) alcohols, such as methyl alcohol, ethyl alcohol, n-propyl alcohol, iso-propyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thiodiglycol; (6) lower alkyl mono- or di-ethers derived from alkylene glycols, such as ethylene glycol monomethyl (or -ethyl) ether, diethylene glycol monomethyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

A mixture of water and a polyhydric alcohol, such as, diethylene glycol, is preferred as the aqueous carrier medium. In the case of a mixture of water and diethylene glycol, the aqueous carrier medium usually contains from about 30% water/70% diethylene glycol to about 95% water/5% diethylene glycol. The preferred ratios are approximately 60% water/40% diethylene glycol to about 95% water/5% diethylene glycol. Percentages are based on the total weight of the aqueous carrier medium.

INK PREPARATION

The ink is prepared by premixing the selected pigment(s) and acrylic block copolymer in water, a water soluble solvent, or the aqueous carrier medium, and then deflocculating the pigment. Optionally, a dispersant compound may be present. Anionic/nonionic surfactants, such as Daniel's Disperse-Ayd W-22, and W-28 and/or a polymeric pigment dispersant, such as, Tamol SN manufactured by Rohm and Haas and SMA 1000 resin manufactured by Sartomer Co., may be used for this purpose. The deflocculating (i.e., dispersing) step may be accomplished in a horizontal mini mill, a ball mill, an attritor, or by passing the mixture through a plurality of nozzles within a liquid jet interaction chamber at a liquid pressure of at least 1000 psi to produce a uniform dispersion of the pigment particles in the aqueous carrier medium.

It generally is desirable to make the pigmented ink jet ink in concentrated form, which is subsequently diluted to the appropriate concentration for use in the ink jet printing system. This technique permits preparation of a greater quantity of pigmented ink from the equipment. If the pigment dispersion was made in a solvent, it is diluted with water and optionally other solvents to the appropriate concentration. If it was made in water, it is diluted with either additional water or water soluble solvents to make a pigment dispersion of the desired concentration. By dilution, the ink is adjusted to the desired viscosity, color, hue, saturation density, and print area coverage for the particular application.

In the case of organic pigments, the ink may contain up to approximately 30% pigment by weight, but will generally be in the range of approximately 0.1 to 10%, preferably approximately 0.1 to 5%, by weight of the total ink composition for most thermal ink jet printing applications. If an inorganic pigment is selected, the ink will tend to contain higher weight percentages of pigment than with comparable inks employing organic pigment, and may be as high as approximately 75% in some cases, since inorganic pigments generally have higher specific gravities than organic pigments. The acrylic block polymer is present in the range of approximately 0.1 to 20% by weight of the total ink composition, preferably in the range of approximately 0.1% to 5%. If the amount of polymer becomes too high, the ink color density will become unacceptably low and it will become difficult to maintain desired ink viscosity. Dispersion stability of the pigment particles is adversely affected if insufficient acrylic block copolymer is present. The amount of aqueous carrier medium is in the range of approximately 70 to 99.8%, preferably approximately 90 to 99.8%, based on total weight of the ink when an organic pigment is selected and approximately 25 to 99.8%, preferably approximately 70 to 99.8% when an inorganic pigment is selected. Other additives, such as biocides, humectants, chelating agents, and viscosity modifiers may be added to the ink for conventional purposes. The choice of additive or combination of additives will be governed by the surface behavior of the additive(s) selected. Optionally, other acrylic and non-acrylic polymers, may be added to improve properties such as water fastness and smear resistance. These may be solvent based, emulsions, or water soluble polymers.

Jet velocity, separation length of the droplets, drop size and stream stability are greatly affected by the surface tension and the viscosity of the ink. Pigmented ink jet inks suitable for use with ink jet printing systems should have a surface tension in the range of about 20 dyne/cm to about 70 dyne/cm and, more preferably, in the range 30 dyne/cm to about 70 dyne/cm. Acceptable viscosities are no greater than 20 cP, and preferably in the range of about 1.0 cP to about 10.0 cP. The ink has physical properties compatible with a wide range of ejecting conditions, i.e., driving voltage and pulse width for thermal ink jet printing devices, driving frequency of the piezo element for either a drop-on-demand device or a continuous device, and the shape and size of the nozzle. The ink has excellent storage stability for a long period and does not clog in an ink jet apparatus. Fixing of the ink on the image recording material, such as, paper, fabric, film, etc., can be carried out speedily and surely with the printing dot being smooth at the border thereof and with spreading of the ink being slight. The printed ink images have clear color tones, high density, excellent water resistance and light fastness. Further the ink does not corrode parts of the ink jet printing device it comes in contact with, and it is essentially odorless, non-toxic and inflammable.

This invention now will be further illustrated, but not limited, by the examples.

EXAMPLES

Block polymers were prepared using the following procedures:

PREPARATION 1

An EHMA//EHMA/MAA 5//5/10 Acid Initiator, Acid Block First polymer was prepared using the following procedure:

A 3-liter flask was equipped with a mechanical stirrer, thermometer, $N_2$ inlet, drying tube outlet, and addition funnels. Tetrahydrofuran THF, 800 gm, and p-xylene, 1.0 gm, was charged to the flask. The catalyst tetrabutyl ammonium m-chlorobenzoate, 700 ml of a 1.0 M solution in acetonitrile, was then added. Initiator, 1,1-bis(trimethylsiloxy)-2-methyl propene, 73.0 gm (0.315 M) was injected. Feed I [tetrabutyl ammonium m-chlorobenzoate, 700 ml of a 1.0 M solution in acetonitrile] was started and added over 150 minutes. Feed II [2-ethylhexyl methacrylate, 312.4 gm (1.58 M), and trimethylsilyl methacrylate, 500.0 gm (3.16 M)] was started at 0.0 minutes and added over 50 minutes. Eighty minutes after Feed II was completed (over 99 % of the monomers had reacted), Feed III [2-ethylhexyl methacrylate, 312.0 gm (1.58 M)] was started and added over 30 minutes.

At 180 minutes, 200 gm of methanol and 250.0 gm water were added to the above solution. It was refluxed for 120 minutes. Then 1470 gm of solvent and hexamethyldisiloxane were stripped out while 670 gm of i-Propanol were added. This made a EHMA//EHMA/MAA 5//5/10 polymer at 55 % solids.

The above block polymer was neutralized using the following procedures:

Procedure A: N,N-Dimethylethanolamine

The EHMA//EHMA/MAA block polymer prepared above was neutralized (100%) by adding the amine to the block copolymer solution and mixing until a homogeneous solution was obtained, usually 2-3 hours. After neutralization, the material was reduced to approximately 25% solids with deionized water.

| INGREDIENT | AMOUNT (GMS) |
| --- | --- |
| BLOCK POLYMER | 102.5 |
| N,N-DIMETHYLETHANOLAMINE | 18.7 |
| DEIONIZED WATER | 102.5 |
| TOTAL | 223.7 |
| WT. % SOLIDS: 25 | |
| pH: 8.4 | |

Procedure B: Potassium Hydroxide

The EHMA//EHMA/MAA block polymer prepared above was neutralized (100%) by adding 15% aqueous potassium hydroxide solution to the block copolymer solution and mixing until a homogeneous solution was obtained. After neutralization, the material was reduced to approximately 25% solids with deionized water.

| INGREDIENT | AMOUNT (GMS) |
| --- | --- |
| BLOCK POLYMER | 102.5 |
| POTASSIUM HYDROXIDE | 78.6 |
| (15% SOLUTION IN DEIONIZED WATER) | |
| DEIONIZED WATER | 42.6 |
| TOTAL | 223.7 |
| WT. % SOLIDS: 25 | |
| PH: 8.0 | |

PREPARATION 2

A block polymer of MMA//MMA/MAA 10//5/7.5, M.W. 2150, was prepared using the following procedure:

A 3-liter flask was equipped with a mechanical stirrer, thermometer, N2 inlet, drying tube outlet, and addition funnels. Tetrahydrofuran (THF), 845 gm, and p-xylene, 2.4 gm, were charged to the flask. The catalyst tetrabutyl ammonium m-chlorobenzoate, 0.9 ml of a 1.0 M solution in acetonitrile, was then added. Initiator, 1,1-bis(trimethylsiloxy)-2-methyl propene, 75.6 gm (0.326 M) was injected. Feed I [tetrabutyl ammonium m-chlorobenzoate, 0.9 ml of a 1.0 M solution in acetonitrile] was started and added over 150 minutes. Feed II [methyl methacrylate, 164 gm (1.64 M), and trimethylsilyl methacrylate, 387 gm (2.45 M)] was started at 0.0 minutes and added over 38 minutes. Fifty-five minutes after Feed II was completed (over 99 % of the monomers had reacted), Feed III [methyl methacrylate, 326.9 gm (3.27 M)] was started and added over 30 minutes.

At 400 minutes, 155 gm of dry methanol were added to the above solution and distillation was begun. During the first stage of distillation, 320.0 gm of material with a boiling point of below 55° C. was removed from the flask. The theoretical amount of methoxytrimethylsilane (BP =54° C.) to be removed is 80.0 gm. Distillation continued during the second stage while the boiling point increased to 76° C. i-Propanol, 904 gm total, was added during the second stage of distillation. A total of 1161 gms of solvent were removed.

The block polymer was neutralized with N,N-dimethylethanolamine (Procedure A) and potassium hydroxide (Procedure B) as described above. PREPARATION 3

A block polymer of NBMA//NBMA/MAA (10//5/10) was prepared using the following procedure:

A 1-liter flask was equipped with a mechanical stirrer, thermometer, N2 inlet, drying tube outlet, and addition funnels. Tetrahydrofuran THF, 350 gm, and p-xylene, 1.0 gm, was charged to the flask. The catalyst tetrabutyl ammonium m-chlorobenzoate, 300 ml of a 1.0 M solution in acetonitrile, was then added. Initiator, 1,1-bis(trimethylsiloxy)-2-methyl propene, 20.0 gm (0.086 M) was injected. Feed I [tetrabutyl ammonium m-chlorobenzoate, 300 ml of a 1.0 M solution in acetonitrile] was started and added over 150 minutes. Feed II [n-butyl methacrylate, 61.1 gm (0.43 M), and trimethylsilyl methacrylate, 136.0 gm (0.86 M)] was started at 0.0 minutes and added over 20 minutes. Two hundred minutes after Feed II was completed (over 99 % of the monomers had reacted), Feed III [n-butyl methacrylate, 121.8 gm (0.86 M)] was started and added over 30 minutes.

At 400 minutes, 55 gm of dry methanol was added to the above solution and distillation begins. During the first stage of distillation, 112.0 gm of material with a boiling point of below 55° C. were removed from the flask. The theoretical amount of methoxytrimethylsilane (BP=54° C.) to be removed was 98.0 gm. Distillation continued during the second stage while the boiling point increased to 76° C. i-Propanol, 420 gm total, was added during the second stage of distillation. A total of 508 gms of solvent were removed.

The block polymer was neutralized with N,N-dimethylethanolamine (Procedure A) and potassium hydroxide (Procedure B) as described above.

PREPARATION 4

A block copolymer BMA//BMA/MAA 5//2.5/5, M.W. 1500, was prepared using the following procedure:

A 3-liter flask was equipped with a mechanical stirrer, thermometer, N2 inlet, drying tube outlet, and addition funnels. Tetrahydrofuran (THF), 780 gm, and p-xylene, 3.6 gm, were charged to the flask. The catalyst tetrabutyl ammonium m-chlorobenzoate, 3.2 ml of 1.0 M solution in acetonitrile, was then added. Initiator, 1,1-bis(trimethylsiloxy)-2-methyl propene, 144.0 gm (0.62 M) was injected. Feed I [tetrabutyl ammonium m-chlorobenzoate, 3.2 ml of a 1.0 M solution in acetonitrile] was started and added over 130 minutes. Feed II [n-butyl methacrylate, 220 gm (1.55 M), and trimethylsilyl methacrylate, 490 gm (3. 1 M)] was started at 0.0 minutes and added over 40 minutes. Thirty minutes after Feed II was completed (over 99% of the monomers had reacted), Feed III [n-butyl methacrylate, 440 gm (3.1 M)] was started and added over 30 minutes.

At 240 minutes, 216 gm of dry methanol were added to the above solution and distillation was begun. During the first stage of distillation, 210.0 gm of material with a boiling point of below 55° C. was removed from the flask. Distillation continued during the second stage while the boiling point increased to 76° C. i-Propanol, 900 gm total, was added and distillation continued until a total of 1438 gms of solvent had been removed. This made a BMA//BMA/MAA 5//2.5/5 polymer at 57.7% solids.

The block polymer was neutralized with N,N-dimethylaminoethanol (Procedure A) and potassium hydroxide (Procedure B) as described in Preparation 1.

PREPARATION 5

A block copolymer EHMA//MMA/MAA 5//10/10, M.W. 2800, was prepared using the following procedures:

A 12-liter flask was equipped with a mechanical stirrer, thermometer, N2 inlet, drying tube outlet, and additional funnels. Tetrahydrofuran (THF), 3255 gm, and p-xylene, 7.9 gm, were charged to the flask. The catalyst tetrabutyl ammonium m-chlorobenzoate, 4 ml of a 1.0 M solution in acetonitrile, was then added. Initiator, 1-methoxy-1-trimethylsiloxy-2-methyl propene, 195.1 gm (1.12 M) was injected. Feed I [tetrabutyl ammonium m-chlorobenzoate, 4.0 ml of a 1.0 M solution in acetonitrile] was started and added over 150 minutes. Feed II [ethylhexyl methacrylate, 1079 gm (5.44 M)] was started at 0.0 minutes and added over 30 minutes. Forty minutes after Feed II was completed (over 99% of the monomers had reacted), Feed III [methyl methacrylate, 1086.5 gm (10.9 M), and trimethylsilyl methacrylate, 1744 gm (11.2 M)] was started and added over 30 minutes.

at 240 minutes, 675 gm of dry methanol were added to the above solution and distillation was begun. During the first stage of distillation, 1050.0 gm of material with a boiling point of below 55° C. was removed from the flask. Distillation continued during the second stage while the boiling point increased to 76° C. i-Propanol, 4025 gm total, was added and distillation continued until a total of 5035 gms of solvent had been removed. This made a EHMA//MMA/MAA 5//10/10 polymer at 48% solids.

The block polymer was neutralized with N,N-dimethylaminoethanol (Procedure A) and potassium hydroxide (Procedure B) as described in Preparation 1.

EXAMPLE 1 (Black)

The following ingredients were added in turn slowly in a beaker with magnetic bar stirring:

| INGREDIENT | AMOUNT (parts by weight) |
| --- | --- |
| Special Black 4A, carbon black pigment (Degussa Corp., Allendale, NJ) | 40.0 |
| Polymer obtained in Preparation 2 (25% solution, neutralized by Procedure A) | 32.0 |
| Diethylene glycol | 30.4 |
| Deionized water | 97.6 |

Stirring was continued for 10-15 minutes until no lumps or dry clumps of pigment were visible. The mixture was added to a mini motormill 100 (Eiger Machinery Inc., Bensenville, Ill. 60106). Milling was carried out at 4500 r.p.m. After 5 minutes the pH was adjusted to 7.5-8.5 with about 1 ml dimethylamionoethanol (Pennwalt Corp., Philadelphia, Pa. 19102). Milling was continued for 55 minutes at which time the particle size was 167 nm as determined on a Brookhaven BI-90 Particle Sizer (Brookhaven Instruments Corp., Holtsville, N.Y. 11742). The dispersion was filtered through a 3M 114A Liquid Filter Bag (3M St. Paul, Minn. 55144) under vacuum.

160 grams of the above dispersion were let down with 38.4 parts of 25% neutralized polymer solution (described above), 91.5 parts deionized water and 30.1 parts diethylene glycol.

The final black ink was prepared by adding 75 parts of 20% diethylene glycol t 75 parts of the above-mentioned dispersion with agitation over a 30 minute period.

This ink had the following physical characteristics:

| | |
| --- | --- |
| Surface tension: | 38.0 dynes/cm |
| Viscosity: | 4.3 cps |
| pH: | 8.1 |

The black ink has good thermal stability and gives excellent print quality as judged by "eye" giving clean, clear black characters on a Hewlett Packard DeskJet Printer (Hewlett Packard, Palo Alto, Calif.) as purchased (See Tables 1, 2 and 3).

EXAMPLE 2

A black ink-jet ink was prepared using the following procedure:

| INGREDIENT | AMOUNT (parts by weight) |
| --- | --- |
| Raven ® 1170, carbon black pigment (Columbian Chemicals Co., Jamesburg, NJ 08831) | 5 |
| Polymer obtained in Preparation 2 (25% solution, neutralized by Procedure A) | 10 |
| Diethylene glycol | 3.5 |
| Deionized Water | 6.5 |

The above-mentioned components were pre-mixed in a beaker as described in Example 1 and dispersed in a horizontal mini-mill for about 2 hours and then let down with 60 parts water and 15 parts diethylene glycol. The finished ink was then filtered through 2 micron filter felt to remove undispersed particles. The ink had the following physical characteristics:

| | |
| --- | --- |
| Viscosity: | 3.3 cps |
| Surface Tension: | 50.8 dyne/cm |
| pH: | 8.5 |
| Particle Size: | 110 nm (107 nm after temp. cycling) |

The ink printed cleanly and with uniform density on a Hewlett-Packard DeskJet printer (Hewlett Packard, Palo Alto, Calif.). Dispersion stability after four cycles of −20° C. (4 hrs)/70° C. (4 hrs) was very good (3 nm change). (see Tables 1, 2 and 3).

EXAMPLE 3 (Black)

A black ink-jet ink was prepared using the following procedure:

| INGREDIENT | AMOUNT (parts by weight) |
|---|---|
| Raven ® 1170, carbon black pigment, (Columbian Chemicals Co. Jamesburg, NJ 08831) | 5 |
| Polymer obtained in Preparation 1, 25% solution, neutralized by Procedure B) | 10 |
| Diethylene glycol | 3.5 |
| Deionized Water | 6.5 |

The above-mentioned components were pre-mixed in a beaker as described in Example 1 and dispersed in a horizontal mini-mill for about 2 hours and then let down with 60 parts water and 15 parts diethylene glycol. The finished ink was then filtered through 2 micron filter felt to remove undispersed particles. The ink had the following physical characteristics:

| Viscosity: | 3.2 cps |
|---|---|
| Surface Tension: | 45.5 dyne/cm |
| pH: | 8.9 |
| Particle Size: | 107 nm (106 nm after temp. cycling) |

The ink has excellent thermal stability and prints cleanly and with uniform density on a Hewlett-Packard DeskJet printer (Hewlett Packard, Palo Alto, Calif.). (See Tables 1, 2 and 3).

EXAMPLE 4 (Black)

A black ink-jet ink was prepared using the following procedure:

| INGREDIENT | AMOUNT (parts by weight) |
|---|---|
| Special Black 4A, carbon black pigment, (Degussa Corp., Allendale NJ 07401) | 5 |
| Polymer obtained in Preparation 3, 25% solution, neutralized by Procedure B) | 10 |
| Diethylene glycol | 8.9 |
| Deionized water | 4.1 |

The above-mentioned components were pre-mixed in a beaker as described in Example 1 and dispersed in a horizontal mini-mill for about 2 hours and then let down with 57.6 parts water and 14.4 parts diethylene glycol. The finished ink was then filtered through 2 micron filter felt to remove undispersed particles. The ink had the following physical characteristics:

| Viscosity: | 3.8 cps |
|---|---|
| Surface Tension: | 45.1 dyne/cm |
| pH: | 7.7 |
| Particle Size: | 165 nm (162 nm after temp. cycling) |

The ink has excellent thermal stability and prints cleanly and with uniform density on a Hewlett-Packard DeskJet printer (Hewlett Packard, Palo Alto, Calif.). (See Tables 1, 2 and 3).

CONTROL 1 (RANDOM POLYMER)

A random polymer with the same chemical composition and similar molecular weight was prepared by radical polymerization as a control.

A four neck flask equipped with a mechanical mixer, reflux condenser, nitrogen inlet, thermometer, and heating mantle was charged with 166 g of 2-propanol and 82 g of 2-butanone and heated to reflux. To this a solution consisting of 1081 g of methyl methacrylate, 463 g of methacrylic acid, and 46 g of n-dodecyl mercaptan was added over a period of 180 minutes. A second feed solution consisting of 93 g of 2,2-Azobis-(2,4-dimethylvaleronitrile) (VAZO 52, manufactured by DU PONT), 463 g of 2-propanol, and 232 g of 2-butanone was added concurrently with the first but over 210 minutes. When addition was complete, mixing was continued at reflux for 30 minutes. The polymer solution was enriched to 90% solids by vacuum drying.

An aqueous ink vehicle was then prepared as follows:

| INGREDIENT | AMOUNT (parts by weight) |
|---|---|
| Polymer | 25.7 |
| Deionized water | 67.1 |
| N,N-Dimethylethanolamine | 7.2 |

Dispersion and ink were then prepared as follows:

| INGREDIENT | AMOUNT (parts by weight) |
|---|---|
| Raven ® 1170, carbon black pigment, (Columbian Chemicals Co. Jamesburg NJ 08831) | 5 |
| Polymer obtained in Control 1 (25.7% solution) | 10 |
| Diethylene glycol | 3.5 |
| Deionized Water | 6.5 |

The above-mentioned components were pre-mixed in a beaker as described in Example 1 and dispersed in a horizontal mini-mill for about 2 hours and then let down with 60 parts water and 15 parts diethylene glycol. The finished ink was then filtered through 2 micron filter felt to remove undispersed particles. The ink had the following physical characteristics:

| Viscosity: | 3.8 cps |
|---|---|
| Surface Tension: | 48.9 dyne/cm |
| pH: | 8.7 |
| Particle Size: | 98 nm (103 nm after temp. cycling) |

This ink printed irregularly on the thermal inkjet printer relative to the ink prepared in the examples using block copolymer dispersants. (See Tables 1, 2 and 3)

EXAMPLE 5: (Cyan)

A cyan ink was prepared using the following procedure:

| INGREDIENT | AMOUNT (parts by weight) |
|---|---|
| Heucophthal ® Blue G, XBT-583D (Heubach, Inc., Newark, NJ) | 30 |
| Polymer obtained in Preparation 2 (25% solution, neutralized by | 60 |

-continued

| INGREDIENT | AMOUNT (parts by weight) |
|---|---|
| Procedure A) | |
| Diethylene glycol | 51 |
| Deionized water | 159 |

The above-mentioned components were pre-mixed in a beaker as described in Example 1 and then dispersed in a mini motormill 100 (Eiger Machinery Inc., Bensenville, Ill. 60106) for 24 minutes using 0.75 mm glass beads at rpm motor speed. The resulting 10% fine pigment dispersion was filtered through a piece of 1 micron filter cloth under vacuum. The finished dispersion has the following physical characteristics:

| | |
|---|---|
| Viscosity: | 5.76 cps |
| Surface Tension: | 46.9 dyne/cm |
| pH: | 7.8 |
| Particle Size: | 121 nm |

The dispersion was let down with diethylene glycol and water to a 2.0% ink in 10/90 diethylene glycol/water mixture for print test. The print test was carried out on a Hewlett Packard DeskJet Printer (Hewlett Packard, Palo Alto, Calif.). (See Tables 1, 2 and 3).

EXAMPLE 6: (Yellow)

A yellow ink was prepared using the following procedure:

| INGREDIENT | AMOUNT (parts by weight) |
|---|---|
| Sunbrite ® Yellow 17, presscake (21.5% solid, Sun Chemical Corp., Cincinnati, OH 45232) | 209 |
| Polymer obtained in Preparation 3 (25% solution, neutralized by Procedure A) | 36 |
| SMA ® 1000 resin, hydrolyzed with DMEA (20% solution, Sartomer Co., West Chester, PA 19382) | 22.5 |
| Deionized water | 32.2 |

The above-mentioned components were pre-mixed in a beaker as described in Example 1 and dispersed in a mini motormill 100 for 90 minutes using 0.75 mm glass beads at 4500 rpm motor speed. The material was then passed through a microfluidizer (Model 110F, Microfluidics Corp, Newton, Mass. 02164) under 7000-9000 psi (493-634 kg/sq cm) pressure for 40 minutes to further reduce the particle size. The resulting fine pigment dispersion was let down with 30 parts 25% polymer solution prepared as described in Preparation 3 and 95 parts water and then filtered through a piece of 1 micron filter cloth under slight vacuum. The finished 10% dispersion has the following physical characteristics:

| | |
|---|---|
| Viscosity: | 6.25 cps |
| Surface Tension: | 49.8 dyne/cm |
| pH: | 8.92 |
| Particle Size: | 205 nm |

The dispersion was let down with diethylene glycol and water to a 2.0% ink in 10/90 diethylene glycol/water mixture for print test. The print test was carried out on a Hewlett Packard DeskJet Printer (Hewlett Packard, Palo Alto, Calif.). (See Tables 1, 2 and 3).

EXAMPLE 7: (Magenta)

A magenta ink was prepared using the following procedure:

| INGREDIENT | AMOUNT (parts by weight) |
|---|---|
| Sunfast ® Magenta 122, presscake (52.8% solid, Sun Chemical Corp., Cincinnati, OH 45232) | 38 |
| Polymer obtained in Preparation 4 (25% solution, neutralized by Procedure A) | 40 |
| Diethylene glycol | 34 |
| Deionized water | 88 |

The above-mentioned components were pre-mixed in a beaker as described in Example 1 and then dispersed in a mini motormill 100 for 24 minutes using 0.75 mm glass beads at 4500 rpm motor speed, the resulting 10% fine pigment dispersion was filtered through a piece of 1 micron filter cloth under slight vacuum. The finished dispersion has the following physical characteristics:

| | |
|---|---|
| Viscosity: | 6.53 cps |
| Surface tension: | 41.1 dyne/cm |
| pH: | 9.07 |
| Particle Size: | 153 nm |

The dispersion was let down with diethylene glycol and water to a 2% ink in 10/90 diethylene glycol/water mixture for print test. The print test was carried out on a Hewlett Packard DeskJet Printer (Hewlett Packard, Palo Alto, Calif.). (See Tables 1, 2 and 3)

EXAMPLE 8: (Magenta)

A magenta ink was prepared using the following procedure:

| INGREDIENT | AMOUNT (parts by weight) |
|---|---|
| Sunfast ® Magenta 122, presscake (52.8% solid, Sun Chemical Corp., Cincinnati, OH 45232) | 38 |
| Polymer obtained in Preparation 5 (25% solution, neutralized by Procedure A) | 40 |
| Diethylene glycol | 34 |
| Deionized water | 88 |

The above-mentioned components were pre-mixed in a beaker as described in Example 1 and then dispersed in a mini motormill 100 for 42 minutes using 0.75 mm glass beads at 4500 rpm motor speed. The resulting 10% fine pigment dispersion was filtered through a piece of 1 micron filter cloth under vacuum. The finished dispersion has the following physical characteristics:

| | |
|---|---|
| Viscosity: | 13.2 cps (measured at 30 rpm) |
| Surface tension: | 45.8 dyne/cm |
| pH: | 7.6 |
| Particle Size: | 164 nm |

The dispersion was let down with a mixture of diethylene glycol/water to give a 2% and a 4% ink in 10/90 mixture of diethylene glycol/water for print test. The print test was carried out on a Hewlett Packard DeskJet Printer (Hewlett Packard, Palo Alto, Calif.) by which the ink drops are generated by a thermal mechanism and on a Xerox 4020 color inkjet printer (Xerox Corp., Fremont, Calif. 94538) by which the ink drops are generated by the vibrations of piezoelectric transducers. (See Tables 1, 2 and 3).

EXAMPLE 9: (Magenta)

A magenta ink was prepared using the following procedure:

| INGREDIENT | AMOUNT (parts by weight) |
|---|---|
| Sunfast ® Magenta 122, presscake (52.8% solid, Sun Chemical Corp., Cincinnati, OH 45232) | 38 |
| Polymer obtained in Preparation 1 (25% solution, neutralized by Procedure A) | 40 |
| Diethylene glycol | 34 |
| Deionized water | 88 |

The above-mentioned components were pre-mixed in a beaker as described in Example 1 and then dispersed in a mini motormill 100 for 24 minutes using 0.75 mm glass beads at 4500 rpm motor speed. The resulting 10% fine pigment dispersion was filtered through a piece of 1 micron filter cloth under slight vacuum. The finished dispersion has the following physical characteristics:

| Viscosity: | 27.4 cps (measured at 12 rpm) |
|---|---|
| Surface tension: | 53.5 dyne/cm |
| pH: | 8.89 |
| Particle Size: | 158 nm |

The dispersion was let down with a mixture of diethylene glycol/water to give a 2% ink in 10/90 mixture of diethylene glycol/water for print test. The print test was carried out in a Xerox ®4020 color inkjet printer (Xerox Corp., Fremont, Calif. 94538) by which the ink drops are generated by vibrations of piezoelectric transducers. (see Tables 1, 2 and 3).

TABLE 1

| | Dispersion Stability | |
|---|---|---|
| Sample | Before(nm) | After(nm) |
| Control 1 | 98 | 103 |
| Example 1 | 167 | 198 |
| Example 2 | 110 | 107 |
| Example 3 | 107 | 106 |
| Example 4 | 165 | 162 |
| Example 5 | 125 | 118 |
| Example 6 | 205 | 211 |
| Example 7 | 153 | 163 |
| Example 8 | 164 | 148 |
| Example 9 | 158 | 151 |

Note: The dispersions were subjected to four 70° C. (4 hours)/−20° C. (4 hours) temperature cycles. The particle size was measured on a Brookhaven BI-90 Particle Sizer (Brookhaven Instruments Corp., Holtsville, NY 11742).

TABLE 2

| Print Quality Example | Print Quality |
|---|---|
| Control 1 | Poor |
| Example 1 | Good |
| Example 2 | Good |
| Example 3 | Good |
| Example 4 | Good |
| Example 5 | Good |
| Example 6 | Good |
| Example 7 | Good |
| Example 8 | Good |

TABLE 2-continued

| Print Quality Example | Print Quality |
|---|---|
| Example 9 | Good |

(a) Print quality is determined on a Hewlett-Packard Deskjet (Hewlett Packard, Palo Alto, CA) and/or a Xerox 4020 color inkjet printer (Xerox Corp., Fremont, CA 94538) on various types of papers and films.
(b) Poor means irregular printing with frequent missing dots and spraying. Good means very small dots with sharp edges and uniform high density.
(c) All samples had excellent light fastness, and good water and smear resistance.

TABLE 3

| | Crusting Time | | |
|---|---|---|---|
| Sample | Short Term (a) | Long Term (b) | RH/Temp. (c) |
| Control 1 | 60 | 70 | 54/23 |
| Example 1 | 60 | | 71/22 |
| Example 2 | 60 | 90 | 54/23 |
| Example 3 | 60 | 90 | 54/23 |
| Example 4 | 60 | 80 | 54/23 |
| Example 5 | 70 | 180 | 30/26 |
| Example 6 | 120 | 300 | 30/26 |
| Example 7 | 60 | 300 | 30/26 |
| Example 8 | 60 | 180 | 30/26 |
| Example 9 | 90 | 300 | 26/25 |

(a) First misplaced dot
(b) 5th misplaced dot
(c) Crust time was determined on a DeskJet printer which was altered so that the printing cartridge could not be primed (evacuated by vacuum) or allowed to spit into a spittoon prior to printing.

What is claimed is:

1. A pigmented ink comprising an aqueous carrier medium and particles of pigment stabilized by an AB or BAB block copolymer wherein:
   (a) the A segment is a hydrophobic homopolymer or copolymer of an acrylic monomer having the formula $$CH_2=C(X)(Y)$$

wherein X is H or $CH_3$; and Y is $C(O)OR_1$, $C(O)NR_2R_3$, or CN, wherein $R_1$ is an alkyl, aryl, or alkylaryl group having 1 to 20 carbon atoms, and $R_2$ and $R_3$ are hydrogen or an alkyl, aryl, or alkylaryl group having 1 to 9 carbon atoms; said A segment having an average molecular weight of at least approximately 300 and being water insoluble; and
   (b) the B segment is a hydrophilic polymer, or salt thereof, of
   (1) an acrylic monomer having the formula $$CH_2=C(X)(Y^1),$$

wherein X is H or $CH_3$; and $Y^1$ is $C(O)OH$, $C(O)NR_2R_3$, $C(O)OR_4NR_2R_3$ or $C(O)OR_5$; wherein $R_2$ and $R_3$ are hydrogen or an alkyl, aryl, or alkylaryl group having 1 to 9 carbon atoms; $R_4$ is an alkyl diradical having 1 to 5 carbon atoms; and $R_5$ is an alkyl group having 1 to 20 carbon atoms and containing one or more hydroxyl or ether groups; or
   (2) a copolymer of the acrylic monomer of (1) with an acrylic monomer having the formula $$CH_2=C(X)(Y)$$

where X and Y are the substituent groups defined for said A segment;
   said B segment having an average molecular weight of at least approximately 300 and being water soluble, with the proviso that said B segment(s) constitute approximately 10 to 90% of said block copolymer, by weight.

2. The pigmented ink of claim 1 wherein the A segment of said block copolymer is a homopolymer or copolymer prepared from at least one monomer selected from the group consisting of methyl methacrylate, ethyl methacrylate, propyl methacrylate, butyl methacrylate, hexyl methacrylate, 2-ethylhexyl methacrylate, octyl methacrylate, lauryl methacrylate, stearyl methacrylate, phenyl methacrylate, hydroxyethyl methacrylate, hydroxypropyl methacrylate, 2-ethoxyethyl methacrylate, methacrylonitrile, 2-trimethylsiloxyethyl methacrylate, glycidyl methacrylate, p-tolyl methacrylate, sorbyl methacrylate, methyl acrylate, ethyl acrylate, propyl acrylate, butyl acrylate, hexyl acrylate, 2-ethylhexyl acrylate, octyl acrylate, lauryl acrylate, stearyl acrylate, phenyl acrylate, hydroxyethyl acrylate, hydroxypropyl acrylate acrylonitrile, 2-trimethyl-siloxyethyl acrylate, glycidyl acrylate, p-tolyl acrylate, and sorbyl acrylate.

3. The pigmented ink of claim 2 wherein the A segment of said block copolymer is a polymer of methyl methacrylate, n-butyl methacrylate, or 2-ethylhexyl methacrylate.

4. The pigmented ink of claim 3 wherein the A segment is a copolymer of methyl methacrylate and n-butyl methacrylate.

5. The pigmented ink of claim 1 or 3 wherein the B segment of said block copolymer is a homopolymer or copolymer prepared from at least one monomer selected from the group consisting of methacrylic acid, acrylic acid, dimethylaminoethyl methacrylate, diethylaminoethyl methacrylate, t-butylaminoethyl methacrylate, dimethylaminoethyl acrylate, diethylaminoethyl acrylate, dimethylaminopropyl methacrylamide, methacrylamide, acrylamide, and dimethylacrylamide.

6. The pigmented ink of claim 1 or 3 wherein the B segment of said block copolymer is a polymer of methacrylic acid or dimethylaminoethyl methacrylate.

7. The pigmented ink of claim 1 wherein said ink contains approximately 0.1 to 10% pigment, 0.1 to 20% block copolymer, and 70 to 99.8% aqueous carrier medium.

8. The pigmented ink of claim 7 wherein said ink contains approximately 0.1 to 5% pigment, 0.1 to 5% block copolymer, and 90 to 99.8% aqueous carrier medium.

9. The pigmented ink of claim 7 wherein the A segment of said block copolymer is a polymer of methyl methacrylate, butyl methacrylate, or 2-ethylhexyl methacrylate and the B segment is a polymer of methacrylic acid or dimethylaminoethyl methacrylate.

10. The pigmented ink of claim 1 or 7 wherein the B segment(s) constitute approximately 25 to 65%, by weight, of said block copolymer.

11. The pigmented ink of claim 1 or 7 wherein the A segment monomer is methyl methacrylate and the B segment is a copolymer of methyl methacrylate and methacrylic acid.

12. The pigmented ink of claim 1 or 7 wherein the A segment monomer is 2-ethylhexyl methacrylate and the B segment is a copolymer of 2-ethylhexyl methacrylate and methacrylic acid.

13. The pigmented ink of claim 1 or 7 wherein the A segment monomer is n-butyl methacrylate and the B segment is a copolymer of n-butyl methacrylate and methacrylic acid.

14. The pigmented ink of claim 1 or 7 wherein the A segment monomer is ethylhexyl methacrylate and the B segment is a copolymer of methyl methacrylate and methacrylic acid.

15. The pigmented ink of claim 1 or 7 wherein the A segment monomer is n-butyl methacrylate and the B segment is a copolymer of 2-hydroxyethyl methacrylate and methacrylic acid.

16. The pigmented ink of claim 1 or 7 wherein the A segment monomer is n-butyl methacrylate and the B segment is a copolymer of 2-hydroxyethyl methacrylate and methacrylic acid.

17. The pigmented ink of claim 1 or 7 wherein the A segment monomer is methyl methacrylate and the B segment is a copolymer of ethylhexyl methacrylate and methacrylic acid.

18. The pigmented ink of claim 1 or 7 wherein the A segment monomer is butyl methacrylate and the B segment is a copolymer of butyl methacrylate and dimethylaminoethyl methacrylate.

19. The pigmented ink of claim 1 wherein the aqueous carrier medium is a mixture of water and a polyhydric alcohol.

20. The pigmented ink of claim 1 wherein the pigment particles have a size of approximately 0.01 to 5 microns.

21. The pigmented ink of claim 1 wherein the surface tension is in the range of approximately 30 to 70 dyne/cm and the viscosity is in the range of approximately 1.0 to 10.0 cP.

22. The pigmented ink of claim 1 wherein the B segment salt is neutralized with a neutralizing agent selected from the group consisting of organic bases, alkanolamines, alkali metal hydroxides, and mixtures thereof.

23. The pigmented ink of claim 1 or 7 wherein the A segment monomer is n-butyl methacrylate and the B segment is a copolymer of methyl methacrylate and methacrylic acid.

24. The pigmented ink of claim 22 wherein the neutralizing agent is sodium hydroxide.

25. The pigmented ink of claim 22 wherein the neutralizing agent is potassium hydroxide.

* * * * *

UNITED STATES PATENT AND TRADEMARK OFFICE
CERTIFICATE OF CORRECTION

PATENT NO. : 5,085,698

DATED : February 4, 1992

INVENTOR(S) : SHEAU-HWA MA, et al

It is certified that error appears in the above-identified patent and that said Letters Patent is hereby corrected as shown below:

On the Title page, please add to item [75] the following inventor:

```
   -- MICHELE ELISE SHEPARD
      Escondido, CA         --.
```

Signed and Sealed this

Eighth Day of June, 1993

Attest:

MICHAEL K. KIRK

*Attesting Officer*     *Acting Commissioner of Patents and Trademarks*

UNITED STATES PATENT AND TRADEMARK OFFICE
CERTIFICATE OF CORRECTION

PATENT NO.   : 5,085,698
DATED        : February 4, 1992
INVENTOR(S)  : Sheau-Hwa Ma It is certified that error appears in the above-identified patent and that said Letters Patent is hereby corrected as shown below:

On the Title Page, please add to item [75]--

Michelle Elise Shepard
Escondido, CA --.

Signed and Sealed this

Seventeenth Day of May, 1994

Attest:

BRUCE LEHMAN

*Attesting Officer*     Commissioner of Patents and Trademarks